(12) United States Patent
Rodriguez et al.

(10) Patent No.: US 6,973,923 B1
(45) Date of Patent: Dec. 13, 2005

(54) DYNAMIC FUEL INJECTION CONTROL PRESSURE SET-POINT LIMITS

(75) Inventors: Rogelio Rodriguez, Plainfield, IL (US); Balmes Tejeda, Chicago, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 123 days.

(21) Appl. No.: 10/894,981

(22) Filed: Jul. 20, 2004

(51) Int. Cl.$^7$ ............................................. F02M 37/04
(52) U.S. Cl. ...................... 123/502; 123/446
(58) Field of Search ................ 123/502, 446, 123/480, 478, 689, 696; 701/104, 103

(56) References Cited

U.S. PATENT DOCUMENTS

| | | |
|---|---|---|
| 5,460,329 A | 10/1995 | Sturman |
| 5,597,118 A | 1/1997 | Carter, Jr. et al. |
| 5,722,373 A | 3/1998 | Paul et al. |
| 6,029,628 A | 2/2000 | Oleksiewicz et al. |
| 6,484,696 B2 * | 11/2002 | Barnes et al. ................ 123/446 |
| 6,681,740 B1 * | 1/2004 | Majewski et al. .......... 123/320 |
| 6,850,832 B1 * | 2/2005 | Rodriguez et al. .......... 701/104 |

* cited by examiner

*Primary Examiner*—Mahmoud Gimie
(74) *Attorney, Agent, or Firm*—Dennis Kelly Sullivan; Susan L. Lukasik; Jeffrey P. Calfa

(57) ABSTRACT

An internal combustion engine fuel system applies injection control pressure to fuel injectors (26) to force fuel into combustion chambers (28). A processor of a control system (22) develops data values for injection control pressure set-point (ICPC_T13) representing desired injection control pressure and evaluates (134) the injection control pressure set-point data values for compliance with an allowable dynamic range defined by a data value for a minimum dynamic limit correlated with engine speed (N) from a function generator (132) and a data value for a maximum dynamic limit correlated with engine temperature (EOT) from a function generator (130). The processor limits the data value of desired injection control pressure that is subsequently processed to control injection control pressure applied by the fuel system to the fuel injectors to the allowable dynamic range.

12 Claims, 2 Drawing Sheets

DYNAMIC FUEL INJECTION CONTROL PRESSURE SET-POINT LIMITS

FIELD OF THE INVENTION

This invention relates to internal combustion engines having combustion chambers into which fuel is injected, and to systems and methods related to closed-loop control of hydraulic pressure that is used to forcefully inject fuel. More specifically, the invention relates to engines, systems, and methods where fuel is forced by injection control pressure directly into engine combustion chambers in properly timed relation to engine operation to mix with air and be ignited by force of compression exerted on the mixture by pistons that reciprocate within engine cylinders forming the combustion chambers.

BACKGROUND OF THE INVENTION

A known electronic engine control system comprises a processor-based engine controller that processes data from various sources to develop control data for controlling certain functions of the engine, including fueling of the engine by injection of fuel into engine combustion chambers. Control of engine fueling involves several factors. One is the quantity of fuel injected during an injection. Another is the timing of an injection. Consequently, the control system must set both the quantity of fuel injected and the time at which the injection occurs during an engine operating cycle.

A known diesel engine that powers a motor vehicle has an oil pump that delivers oil under pressure to an oil rail serving electric-actuated fuel injection devices, or simply fuel injectors, that use oil from the oil rail to force injections of fuel. The pressure in the oil rail is sometimes referred to as injector control pressure, or ICP, and that pressure is under the control of an appropriate ICP control strategy that is an element of the overall engine control strategy implemented in the engine control system. ICP is a factor in setting the quantity of fuel injected during an injection.

Examples of fuel systems containing fuel injection devices that utilize ICP oil to force fuel into engine combustion chambers via plungers are found in U.S. Pat. Nos. 5,460,329; 5,597,118; 5,722,373; and 6,029,628. The device of the latter has a plunger that is displaced within a pumping chamber by oil at ICP from an oil rail to force fuel out of an internal pumping chamber of the device. The ICP oil pressure amplifies the fuel pressure within the device to a magnitude large enough for forcing a normally closed control valve at an outlet of the device to open. When that outlet control valve opens, the amplified fuel pressure forces fuel through the outlet and into the corresponding combustion chamber.

Because ICP in the oil rail is a significant factor in setting the quantity of fuel injected during an injection, the ability to accurately control ICP is of obvious importance in an engine control strategy. Control of ICP is of course complicated because changing engine conditions can act in ways that tend to change ICP.

Changes in desired ICP that result from the processing of certain data by a processor of the engine controller to set desired ICP are one source of complication. Another source is how a particular oil system responds to changing conditions. Consequently, closed-loop control of ICP is one strategy for securing the best correspondence of actual ICP to desired ICP.

Because control of fuel injection impacts tailpipe emissions, improvements in control of fuel injection can reduce the amount of undesired products of combustion in tailpipe emissions. Where laws and regulations concerning tailpipe emissions are becoming increasingly strict, an ability to achieve reduced tailpipe emissions is seen to be vitally important to engine and motor vehicle manufacturers.

SUMMARY OF THE INVENTION

Briefly, the present invention relates to improvements in control of ICP utilizing certain known parameters in novel ways. Commonly owned utility patent application Ser. No. 10/692,866, filed 24 Oct. 2003, in the name of one of the present inventors, Rogelio Rodriguez, relates to map-scheduled gains for closed-loop control of ICP. Part of that control strategy comprises the development of ICP error data by subtracting a data value representing actual ICP from a data value representing desired ICP. The data value for the ICP error data is the error input for closed-loop control of ICP.

The present invention arises in the context of developing data values for desired ICP and in particular relates to a novel strategy for dynamic adjustment of set-point limits for desired ICP.

The need to achieve desired engine performance while complying with tailpipe emission requirements imposes stringent demands on engine design. Engine temperature and engine speed are parameters that are commonly used in fuel injection control strategy. The present invention utilizes those parameters in a novel way to establish upper and lower set-point limits for desired ICP.

As engine temperature and engine speed change, the upper and lower set-point limits are dynamically adjusted in ways that strive to maintain high-quality fuel injection for assuring compliance with relevant tailpipe emission requirements without detriment to desired engine operation and performance.

Accordingly a generic aspect of the invention relates to an internal combustion engine comprising a fuel system that applies injection control pressure to fuel injectors to force fuel into combustion chambers and a control system comprising a processor for processing data to develop data values for injection control pressure set-point representing desired injection control pressure.

The processor evaluates the injection control pressure set-point data values for compliance with an allowable dynamic range defined by a data value for a minimum dynamic limit correlated with engine speed and a data value for a maximum dynamic limit correlated with engine temperature and limits the data value of desired injection control pressure that is subsequently processed to control injection control pressure applied by the fuel system to the fuel injectors to the allowable dynamic range.

Another generic aspect relates to the control system that has just been described.

Still another generic aspect relates to the method that is performed by the control system just described.

The foregoing, along with further features and advantages of the invention, will be seen in the following disclosure of a presently preferred embodiment of the invention depicting the best mode contemplated at this time for carrying out the invention. This specification includes drawings, now briefly described as follows.

DESCRIPTION OF THE PREFERRED EMBODIMENT

Figure 1:
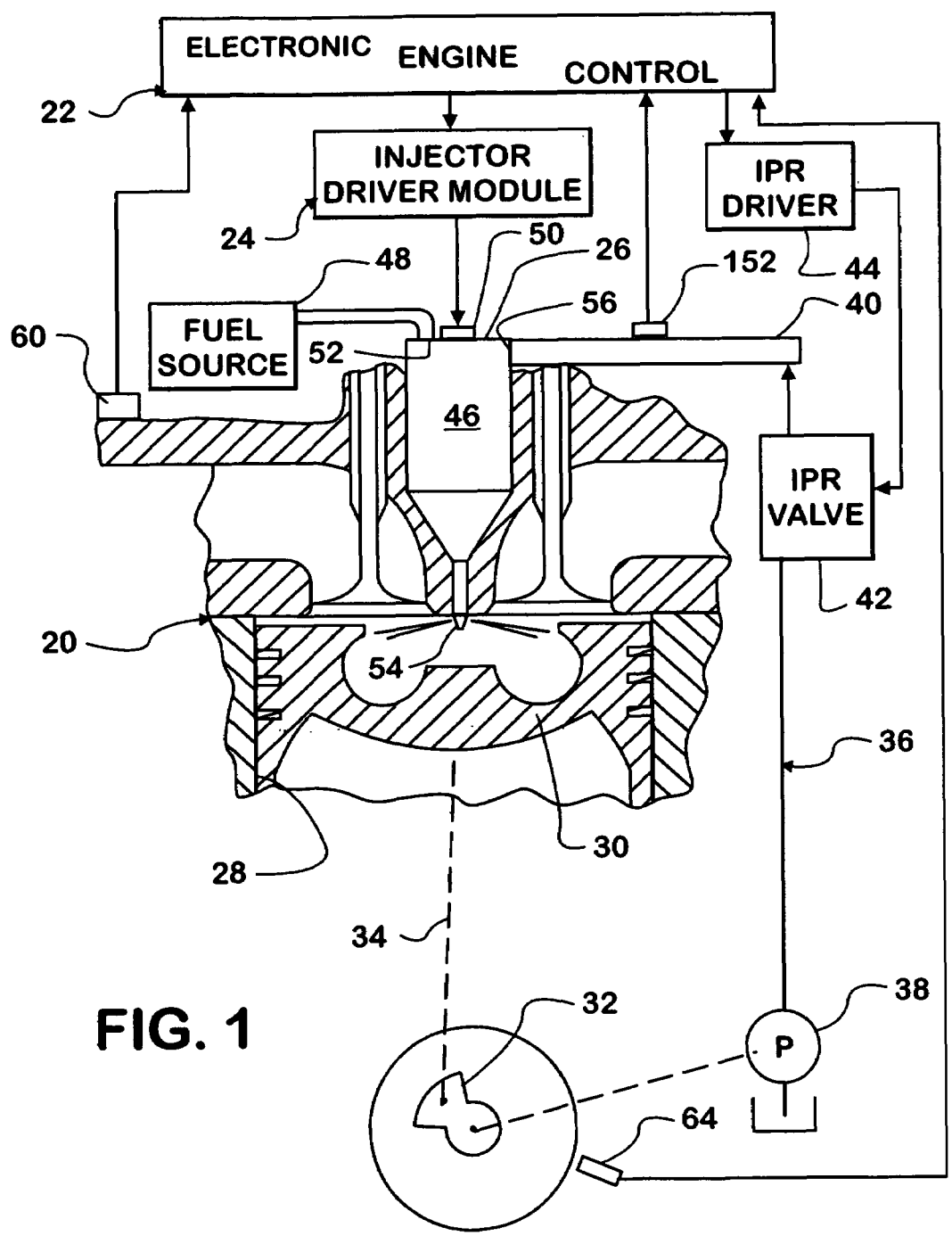
FIG. 1 is a general schematic diagram of a portion of an exemplary diesel engine relevant to an understanding of the invention.

FIG. 1 shows a schematic diagram of a portion of an exemplary diesel engine 20 relevant to an understanding of principles of the present invention. Engine 20 is used for powering a motor vehicle and comprises a processor-based engine control system 22 that processes data from various sources to develop various control data for controlling various aspects of engine operation. The data processed by control system 22 may originate at external sources, such as sensors, and/or be generated internally.

Control system 22 includes an injector driver module 24 for controlling the operation of electric-actuated fuel injection devices 26. Each device 26 mounts on the engine in association with a respective engine combustion chamber illustrated by an engine cylinder 28 within which a piston 30 reciprocates. Each piston is coupled to a crankshaft 32 by a corresponding connecting rod 34. A processor of engine control system 22 can process data sufficiently fast to calculate, in real time, the timing and duration of device actuation to set both the timing and the amount of fueling.

Engine 20 further comprises an oil system 36 having a pump 38 for drawing oil from a sump and delivering the oil under pressure to an oil rail 40 that serves in effect as a manifold for supplying oil, as a control fluid, to the individual devices 26. An injection pressure regulator (IPR) valve 42 is under the control of control system 22 via an IPR driver 44 to regulate the hydraulic pressure of oil in oil rail 40. One example of an IPR valve comprises an electromechanical actuator that causes the valve to increasingly open as the duty cycle of a duty-cycle-modulated voltage increases, thereby increasingly diverting pumped oil away from oil rail 40.

Each device 26 comprises a body 46 that mounts on engine 20 in association with oil rail 40, a respective cylinder 28, and a source of fuel 48. Device 26 has an electrical connector 50 that provides for the electrical connection of its actuator to injector driver module 24. Fuel source 48 supplies liquid fuel to a fuel inlet port 52 of body 46. Body 46 further comprises a fuel outlet port, i.e. a nozzle 54, through which fuel is injected into cylinder 28, and a control fluid inlet port 56 that is communicated to the oil in oil rail 40.

The hydraulic pressure of the oil in rail 40 provides injector control pressure, or ICP, and it is that pressure that is controlled in accordance with the strategy described in the above-mentioned application Ser. No. 10/692,866. Each device 26 has a plunger that, during the injecting phase of device operation, is displaced within an internal pumping chamber by oil at ICP from oil rail 40 to force fuel out of the pumping chamber. The timing and the stroke of the plunger are controlled by control system 22. ICP applied through the plunger acts on the fuel in the pumping chamber, amplifying the pressure of fuel to a magnitude large enough for forcing a normally closed control valve in nozzle 54 to open so that the amplified fuel pressure forces the fuel through the nozzle into cylinder 28 as the plunger is being displaced. Actual ICP in rail 40 is controlled by control system 22 acting on IPR valve 42 via driver 44.

The control strategy operates to establish a desired set-point for ICP and cause valve 42 to operate in way that forces actual ICP in rail 40 to the desired set-point. As engine 20 runs and changing conditions call for change in the ICP set-point, the strategy continues to force actual ICP to follow the changing desired set-point for ICP. Specific details may be obtained from that application and need not be repeated here.

Figure 2:
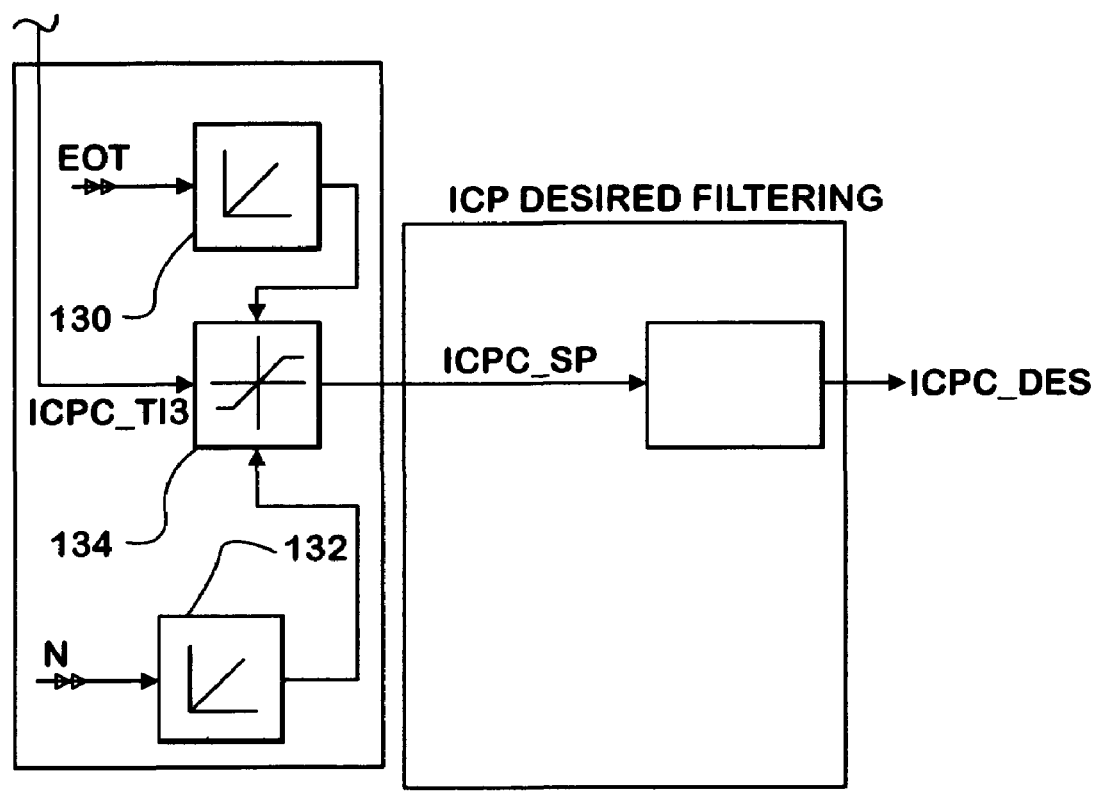
FIG. 2 is a schematic software strategy diagram of an exemplary embodiment of control strategy according to the present invention.

FIG. 2 illustrates a specific example of the present invention forming one part of the overall control strategy embodied in control system 22.

The strategy described in application Ser. No. 10/692,866 sets a commanded ICP on the basis of various parameters including engine temperature, barometric pressure, engine speed, and desired engine fueling. A data value that represents engine temperature (parameter EOT) is obtained from any suitable source, such as an engine oil temperature sensor 60 shown in FIG. 1. A data value representing engine speed (parameter N) is obtained from any suitable source, such as a crankshaft sensor 64 shown in FIG. 1.

The data value for engine temperature EOT is an input to a function generator 130, and the data value for engine speed N, an input to a function generator 132. Function generator 130 contains a number of data values each representing a particular maximum limit set-point for ICP. Each data value correlates with a corresponding fractional span of engine temperatures over a range of temperatures. For any given temperature that falls within one of those fractional spans, function generator 130 will supply a corresponding value for the maximum limit set-point for ICP.

Function generator 132 contains a number of data values each representing a particular minimum limit set-point for ICP. Each data value correlates with a corresponding fractional span of engine speeds over a range of engine speeds. For any given speed that falls within one of those fractional spans, function generator 132 will supply a corresponding value for the minimum limit set-point for ICP.

A data value for desired ICP is calculated using an appropriate algorithm. The data value is identified by a parameter ICPC_T13, and so long as it is within the dynamic range allowed by function generators 130, 132, that data value is passed by an evaluation function 134 to a filter designated ICP Desired Filtering. If the data value for ICPC_T13 is greater than the data value for the maximum limit set by function generator 130, then the data value for the maximum limit set by function generator 130 is passed to the filter. If the data value for ICPC_T13 is less than the data value for the minimum limit set by function generator 132, then the data value set by function generator 132 is passed to the filter. The evaluation of ICPC_T13 against the allowable range defined by the limits results in a data value for a parameter ICPC_SP which is passed to the filter. The filter then provides a data value for Desired ICP, represented by the data parameter ICPC_DES in application Ser. No. 10/692,866.

The disclosed strategy of using engine temperature for dynamic adjustment of maximum allowable ICP can prevent changing conditions from affecting an engine in undesired ways due to oil viscosity effects. The strategy of using engine speed for dynamic adjustment of minimum ICP can prevent changing conditions from restricting fueling in ways that could adversely affect the quality of combustion.

While a presently preferred embodiment of the invention has been illustrated and described, it should be appreciated that principles of the invention apply to all embodiments falling within the scope of the following claims.

What is claimed is:

1. An internal combustion engine comprising:
a fuel system that applies injection control pressure to fuel injectors to force fuel into combustion chambers; and
a control system comprising a processor for processing data to develop data values for injection control pressure set-point representing desired injection control pressure, for evaluating the injection control pressure set-point data values for compliance with an allowable dynamic range defined by a data value for a minimum dynamic limit correlated with engine speed and a data value for a maximum dynamic limit correlated with engine temperature, and for limiting the data value of desired injection control pressure that is subsequently processed to control injection control pressure applied by the fuel system to the fuel injectors to the allowable dynamic range.

2. An engine as set forth in claim 1 wherein the control system comprises a function generator containing a number of data values each of which represents a particular maximum limit for injection control pressure set-point that correlates with a corresponding fractional span of engine temperatures over a range of temperatures, and the processor processes a data value representing engine temperature according to the function generator to cause the corresponding data value for the maximum limit for injection control pressure set-point to be processed as one limit of the dynamic range as the processor evaluates the injection control pressure set-point data values for compliance with the allowable dynamic range.

3. An engine as set forth in claim 1 wherein the control system comprises a function generator containing a number of data values each of which represents a particular minimum limit for injection control pressure set-point that correlates with a corresponding fractional span of engine speeds over a range of engine speeds, and the processor processes a data value representing engine speed according to the function generator to cause the corresponding data value for the minimum limit for injection control pressure set-point to be processed as one limit of the dynamic range as the processor evaluates the injection control pressure set-point data values for compliance with the allowable dynamic range.

4. An engine as set forth in claim 1 wherein the control system comprises a first function generator containing a number of data values each of which represents a particular maximum limit for injection control pressure set-point that correlates with a corresponding fractional span of engine temperatures over a range of temperatures and a second function generator containing a number of data values each of which represents a particular minimum limit for injection control pressure set-point that correlates with a corresponding fractional span of engine speeds over a range of engine speeds, the processor processes a data value representing engine temperature according to the first function generator to cause the corresponding data value for the maximum limit for injection control pressure set-point to be processed as one limit of the dynamic range as the processor evaluates the injection control pressure set-point data values for compliance with the allowable dynamic range, and the processor processes a data value representing engine speed according to the second function generator to cause the corresponding data value for the minimum limit for injection control pressure set-point to be processed as the other limit of the dynamic range as the processor evaluates the injection control pressure set-point data values for compliance with the allowable dynamic range.

5. A control system for an internal combustion engine having a fuel system that applies injection control pressure to fuel injectors to force fuel into combustion chambers, the control system comprising:
a processor for processing data to develop data values for injection control pressure set-point representing desired injection control pressure, for evaluating the injection control pressure set-point data values for compliance with an allowable dynamic range defined by a data value for a minimum dynamic limit correlated with engine speed and a data value for a maximum dynamic limit correlated with engine temperature, and for limiting the data value of desired injection control pressure that is subsequently processed to control injection control pressure applied by the fuel system to the fuel injectors to the allowable dynamic range.

6. A control system as set forth in claim 5 comprising a function generator containing a number of data values each of which represents a particular maximum limit for injection control pressure set-point that correlates with a corresponding fractional span of engine temperatures over a range of temperatures, and wherein the processor processes a data value representing engine temperature according to the function generator to cause the corresponding data value for the maximum limit for injection control pressure set-point to be processed as one limit of the dynamic range as the processor evaluates the injection control pressure set-point data values for compliance with the allowable dynamic range.

7. A control system as set forth in claim 5 comprising a function generator containing a number of data values each of which represents a particular minimum limit for injection control pressure set-point that correlates with a corresponding fractional span of engine speeds over a range of engine speeds, and wherein the processor processes a data value representing engine speed according to the function generator to cause the corresponding data value for the minimum limit for injection control pressure set-point to be processed as one limit of the dynamic range as the processor evaluates the injection control pressure set-point data values for compliance with the allowable dynamic range.

8. A control system as set forth in claim 5 comprising a first function generator containing a number of data values each of which represents a particular maximum limit for injection control pressure set-point that correlates with a corresponding fractional span of engine temperatures over a range of temperatures and a second function generator containing a number of data values each of which represents a particular minimum limit for injection control pressure set-point that correlates with a corresponding fractional span of engine speeds over a range of engine speeds, and wherein the processor processes a data value representing engine temperature according to the first function generator to cause the corresponding data value for the maximum limit for injection control pressure set-point to be processed as one limit of the dynamic range as the processor evaluates the injection control pressure set-point data values for compliance with the allowable dynamic range, and the processor processes a data value representing engine speed according to the second function generator to cause the corresponding data value for the minimum limit for injection control pressure set-point to be processed as the other limit of the dynamic range as the processor evaluates the injection control pressure set-point data values for compliance with the allowable dynamic range.

9. A method of operating an internal combustion engine having a fuel system that applies injection control pressure to fuel injectors to force fuel into combustion chambers and a control system comprising a processor for processing data to develop data values for injection control pressure set-point representing desired injection control pressure, the method comprising:

processing data to evaluate the injection control pressure set-point data values for compliance with an allowable dynamic range defined by a data value for a minimum dynamic limit correlated with engine speed and a data value for a maximum dynamic limit correlated with engine temperature and limiting the data value of desired injection control pressure that is subsequently processed to control injection control pressure applied by the fuel system to the fuel injectors to the allowable dynamic range.

10. A method as set forth in claim 9 comprising processing a data value representing engine temperature according to a function generator containing a number of data values, each of which represents a particular maximum limit for injection control pressure set-point that correlates with a corresponding fractional span of engine temperatures over a range of temperatures, to cause the corresponding data value for the maximum limit for injection control pressure set-point to be processed as one limit of the dynamic range as the processor evaluates the injection control pressure set-point data values for compliance with the allowable dynamic range.

11. A method as set forth in claim 9 comprising processing a data value representing engine speed according to a function generator containing a number of data values, each of which represents a particular minimum limit for injection control pressure set-point that correlates with a corresponding fractional span of engine speeds over a range of engine speeds, to cause the corresponding data value for the minimum limit for injection control pressure set-point to be processed as one limit of the dynamic range as the processor evaluates the injection control pressure set-point data values for compliance with the allowable dynamic range.

12. A method as set forth in claim 9 comprising processing a data value representing engine temperature according to a first function generator containing a number of data values, each of which represents a particular maximum limit for injection control pressure set-point that correlates with a corresponding fractional span of engine temperatures over a range of temperatures, to cause the corresponding data value for the maximum limit for injection control pressure set-point to be processed as one limit of the dynamic range as the processor evaluates the injection control pressure set-point data values for compliance with the allowable dynamic range, and processing a data value representing engine speed according to a function generator containing a number of data values, each of which represents a particular minimum limit for injection control pressure set-point that correlates with a corresponding fractional span of engine speeds over a range of engine speeds, to cause the corresponding data value for the minimum limit for injection control pressure set-point to be processed as the other limit of the dynamic range as the processor evaluates the injection control pressure set-point data values for compliance with the allowable dynamic range.

* * * * *